United States Patent
Steinke et al.

(10) Patent No.: US 8,222,891 B2
(45) Date of Patent: Jul. 17, 2012

(54) COMPENSATING FOR POSITION ERRORS IN DISPLACEMENT TRANSDUCERS

(75) Inventors: Kurt Steinke, Vancouver, WA (US); Michael F. Klopfenstein, Portland, OR (US); Bradley B. Branham, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 477 days.

(21) Appl. No.: 12/387,399

(22) Filed: May 1, 2009

(65) Prior Publication Data

US 2010/0277161 A1 Nov. 4, 2010

(51) Int. Cl.
*G01B 7/14* (2006.01)

(52) U.S. Cl. .............................. 324/207.17; 324/207.24

(58) Field of Classification Search ............. 324/207.17, 324/207.24
See application file for complete search history.

(56) References Cited

U.S. PATENT DOCUMENTS

| | | | |
|---|---|---|---|
| 4,737,698 A | 4/1988 | McMullin et al. | |
| 4,820,961 A | 4/1989 | McMullin | |
| 4,887,465 A | 12/1989 | Bryne et al. | |
| 5,434,504 A | 7/1995 | Hollis et al. | |
| 5,804,963 A | 9/1998 | Meyer | |
| 5,841,274 A | 11/1998 | Masreliez et al. | |
| 5,886,519 A * | 3/1999 | Masreliez et al. | 324/207.17 |
| 5,973,494 A | 10/1999 | Masreliez et al. | |
| 5,998,990 A | 12/1999 | Andermo et al. | |
| 6,002,250 A | 12/1999 | Masreliez et al. | |
| 6,005,387 A | 12/1999 | Andermo et al. | |
| 6,011,389 A | 1/2000 | Masreliez et al. | |
| 6,049,204 A | 4/2000 | Andermo et al. | |
| 6,054,851 A | 4/2000 | Masreliez et al. | |
| 6,124,708 A * | 9/2000 | Dames | 324/207.12 |
| 6,157,188 A | 12/2000 | Steinke | |
| 6,271,661 B2 | 8/2001 | Andermo et al. | |
| 6,329,813 B1 | 12/2001 | Andermo | |
| 6,400,138 B1 | 6/2002 | Andermo | |
| 6,636,035 B2 * | 10/2003 | Kiriyama et al. | 324/207.17 |
| 7,443,159 B2 | 10/2008 | Habenschaden et al. | |
| 2008/0018328 A1 | 1/2008 | Meyer | |
| 2008/0164870 A1 | 7/2008 | Beichler et al. | |

* cited by examiner

*Primary Examiner* — Arleen M Vazquez

(57) ABSTRACT

Methods of compensating for position errors due to signal scaling, linearity, and offset between first and second members in a displacement transducer are provided, including: producing a first signal at the first member; producing a second signal at the first member; modulating the first signal at the second member to include at least one region with an invariant amplitude as the first and second members are displaced relative to one another along a measurement axis; determining a relation between a sample of the second signal and the invariant amplitude of the first signal as an indication of an error parameter; and generating a compensated sample based upon the determined relation.

14 Claims, 7 Drawing Sheets

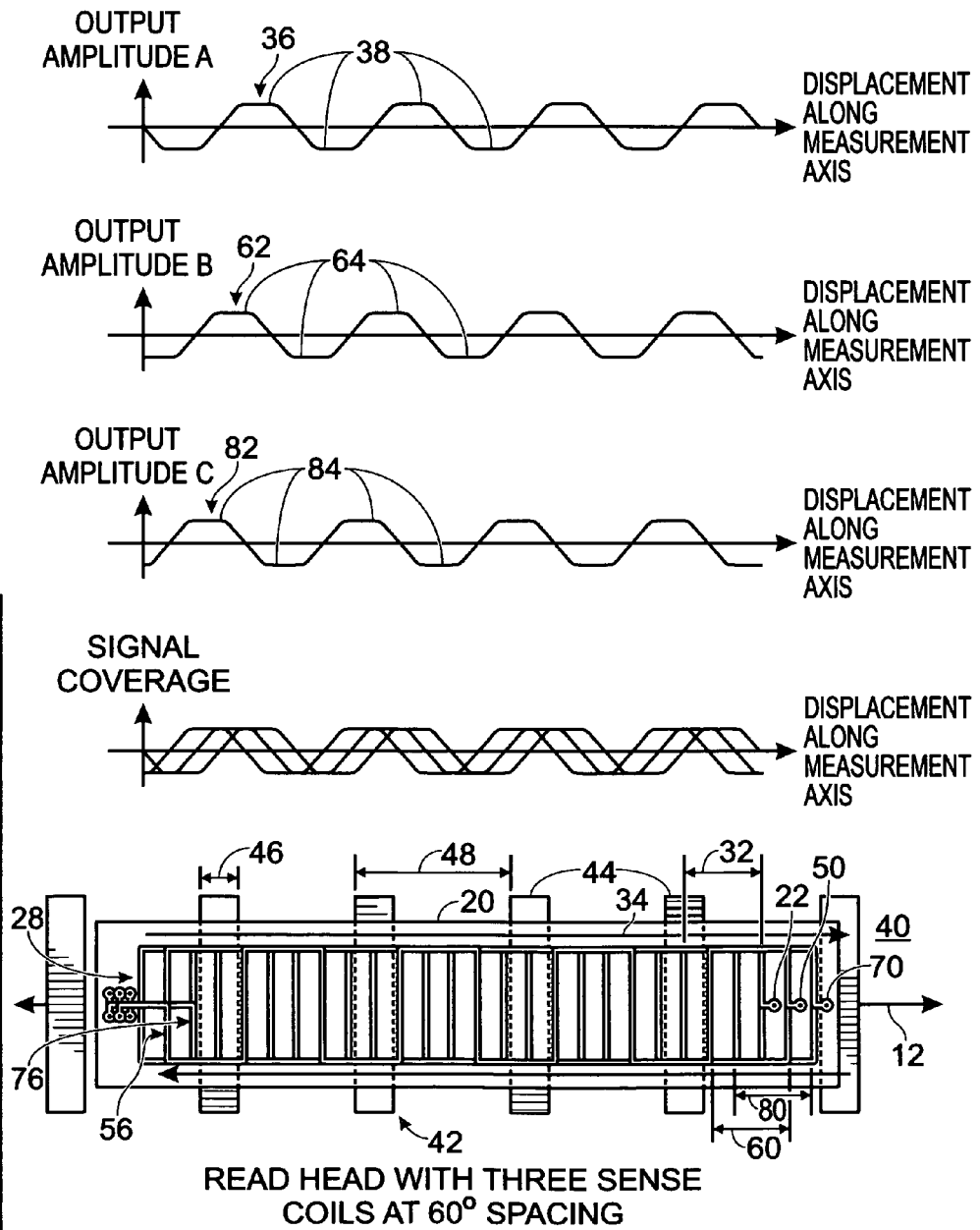

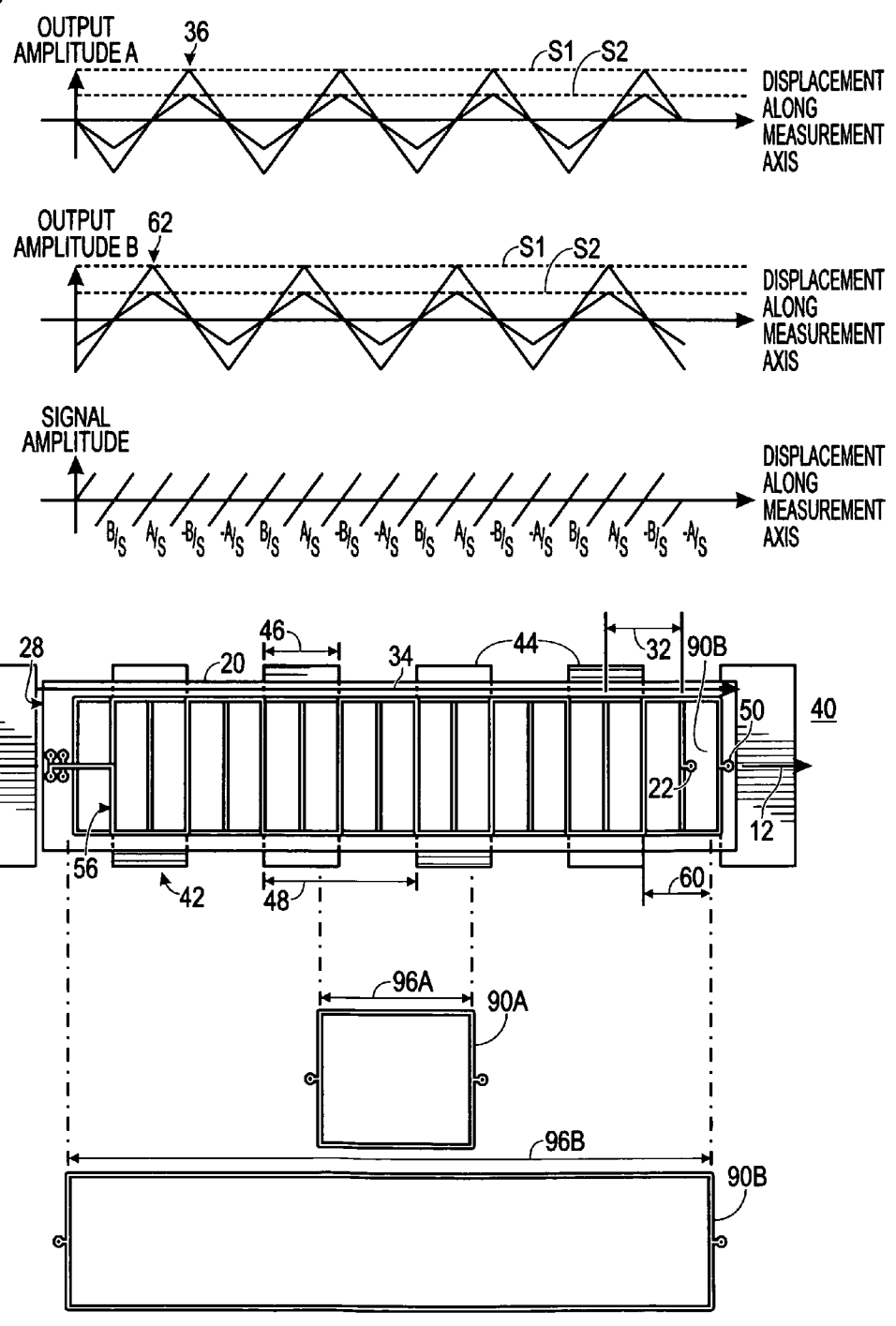

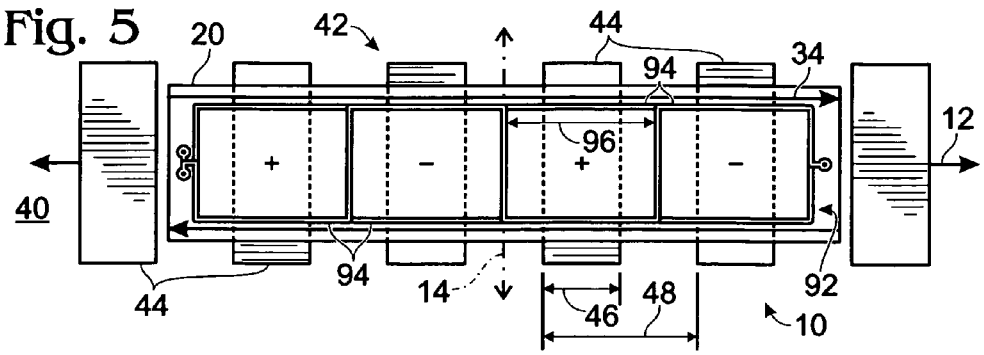
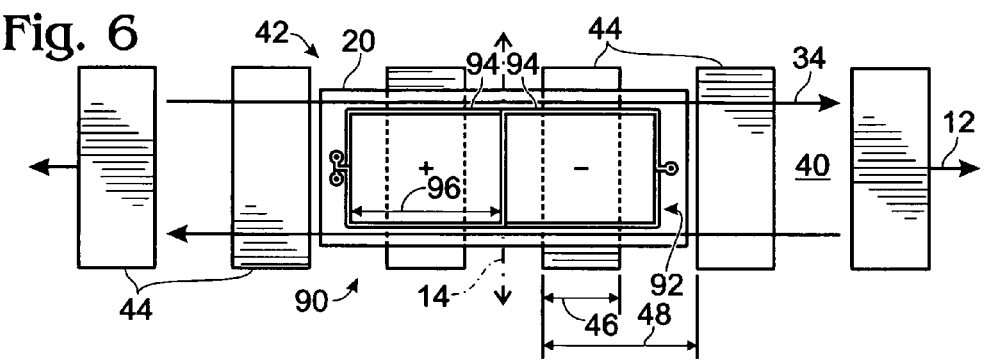
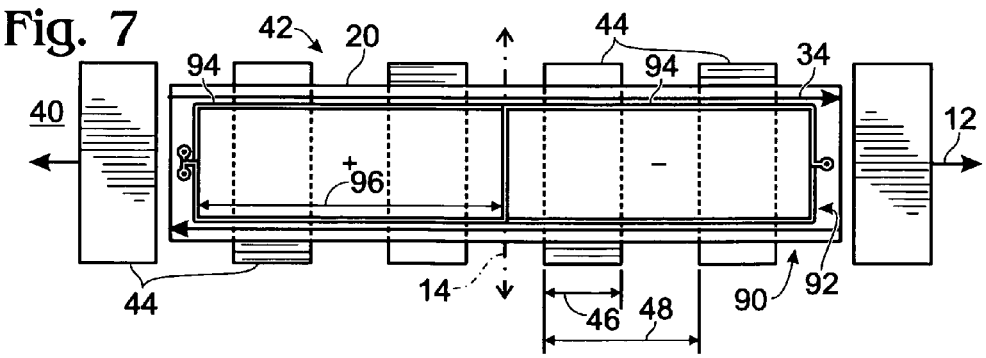
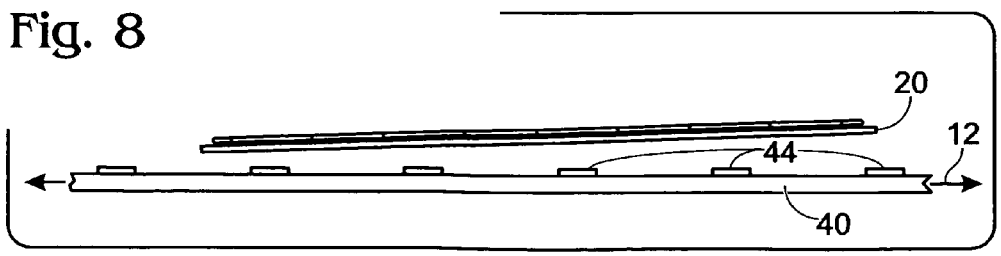

COMPENSATING FOR POSITION ERRORS IN DISPLACEMENT TRANSDUCERS

BACKGROUND

Linear and rotary displacement transducers are used in a number of applications to determine a relative position of two or more objects relative to one another along measurement axes. Displacement transducers may utilize various mechanisms, such as electricity, magnetism and/or light, to make such a determination.

Inductive displacement transducers are a class of displacement transducers that operate on the principle that an inductive coupling between coils or loops of a transformer can be increased or decreased when electrically conductive or magnetically soft materials (hereafter referred to as "flux modulators") are present in the coupling field (i.e., the flux). This class includes "eddy current", "screened" inductance, "modulated" inductance, and "spoiled" inductance transducers.

BRIEF DESCRIPTION OF THE DRAWINGS

FIG. 3 is a schematic view of a displacement transducer including three sense windings offset from one another to produce three signals, according to an embodiment of the disclosure.

FIG. 4 is a schematic view of a displacement transducer including two sense windings similar to those shown in FIGS. 1-3 and two variations of a single-loop sense winding for position compensation, according to an embodiment of the disclosure.

FIGS. 5-7 are schematic views of compensation sense windings, according to three embodiments of the disclosure.

FIG. 8 depicts two members upon which an example displacement transducer is included, the two members being tilted relative to one another, according to an embodiment of the disclosure.

DETAILED DESCRIPTION

Inductive displacement transducers typically include a first object with at least one sense winding, and a second object with a passive scale. The scale may include a series of flux modulators (e.g., electrically conductive or magnetic components). In operation, the sense winding may be charged inductively with current by an excitation winding. When the flux modulators are brought into proximity with the charged loops (i.e., into the flux), the induced current in the loops is modulated in a manner that can be measured. This measurement can in turn be used to determine the position of the first object relative to the second object.

There are various types of error parameters that can contribute to position error in a displacement transducer. One error parameter is scaling error, which is introduced when the distance between scale elements or sense winding elements varies from the ideal or desired distance. To use the analogy of a ruler, an 11-inch ruler divided into 12 equal "inches" would have a scaling error. Another error parameter that contributes to position error is offset error, which is introduced when the first object and the second object do not begin or end at the same point. A third error parameter, linearity error, is introduced where the flux modulators or loops are not uniform. Returning to the ruler analogy, if the increments on the ruler were not all equal in length, the ruler has linearity error. Scaling, offset and linearity errors may be compensated in order to measure position correctly.

Figure 1:
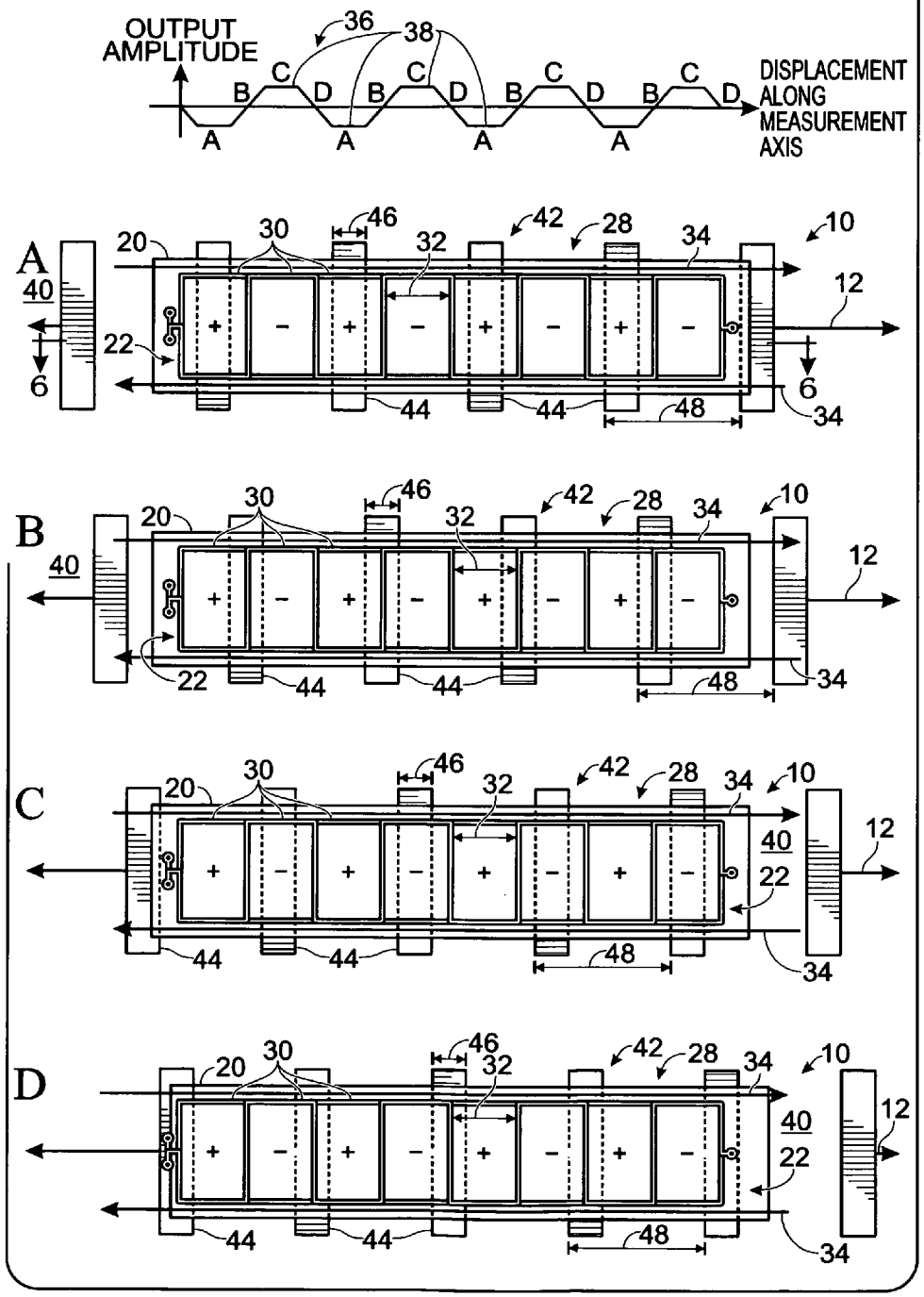
FIG. 1 is a schematic view of a displacement transducer including a single sense winding, according to an embodiment of the disclosure.

FIG. 1 illustrates a displacement transducer 10 for detecting a position of a first member 20 relative to a second member 40 along a measurement axis 12. A sense winding 22 is mounted on first member 20 and includes a series 28 of loops 30 that define the "sense winding", extending along measurement axis 12. Each loop 30 extends a first distance 32 along measurement axis 12. Numerals referencing corresponding components may be similar among the drawings. Not every number in every drawing will be discussed in this specification.

An excitation winding 34 is provided on first member 20 to inductively charge sense winding 22. More particularly, an alternating current is passed through excitation winding 34 in opposite directions on opposite sides, as shown by the arrows, so that an alternating magnetic field is created that at any instant has relatively uniform intensity inside the loop formed by excitation winding 34. Although shown as two separate lines, excitation winding 34 is typically a single loop. The magnetic field produced by excitation winding 34 induces an alternating voltage potential across sense winding 22. The alternating clockwise and counter-clockwise windings cause the areas enclosed by the loops to have alternating polarities relative to the excitation signal, as indicated by the plus and minus symbols. Although in this example each loop 30 is depicted as being rectangular, such depiction is not meant to be limiting, and it should be understood that loops having other shapes (e.g., circular, elliptical, sinusoidal) also are contemplated.

A series 42 of flux modulators 44 is formed on second member 40 at regular intervals. Each flux modulator 44 extends a second distance 46 along measurement axis 12 that differs from the first distance 32 (the width of each loop 30 in sense winding 22) so that the series 42 has a repeat length 48. Each flux modulator 44 may be conductive (i.e., a flux disrupter) or magnetic (i.e., a flux enhancer). Where each flux modulator 44 is conductive, the field generated by excitation winding 34 induces eddy currents in flux modulator 44 that oppose the inductive coupling of excitation winding 34 with sense winding 22.

First member 20 is shown in FIG. 1 in three separate positions relative to second member 40, depicted at A, B and C. An output amplitude 36 of sense winding 22 is shown above as it would be affected as first member 20 and second member 40 are displaced relative to one another along measurement axis 12.

In position A, the first series of loops (indicated at 28) is positioned relative to the series of flux modulators (indicated at 42) so that the positive loops completely overlap the flux modulators, cancelling out a portion of the positive polarities and causing sense winding 22 to have a negative net output amplitude. In position B, first series of loops 28 is positioned relative to series 42 of flux modulators so that the positive and negative loops equally overlap the flux modulators, causing sense winding 22 to have a net output amplitude of zero. In position C, first series of loops 28 is positioned relative to series 42 of flux modulators so that the negative loops completely overlap the flux modulators, causing sense winding 22 to have a positive net output amplitude. In position D the first series of loops 28 is positioned relative to the series of flux modulators so that the positive and negative loops equally overlap the flux modulators causing sense winding 22 to have a net output amplitude of zero.

In FIG. 1, first distance 32—which represents the width of each loop 30—is approximately ½ of repeat length 48, and second distance 46—representing the width of each flux modulator 44—is approximately ¼ of repeat length 48. However, other configurations are possible. For example, in some embodiments, first distance 32 is approximately ½ of repeat length 48, and second distance 46 is approximately ¾ of repeat length 48. In yet other embodiments, first distance 32 is approximately ¼ of repeat length 48 and second distance 46 is approximately ½ of repeat length 48. Various sizes are contemplated herein.

Sizing each flux modulator 44 differently from each loop 30 causes the series of flux modulators to modulate the output amplitude 36 of sense winding 22 to include at least one region 38 of invariant amplitude as first member 20 and second member 40 are displaced relative to one another along measurement axis 12. This can be seen in FIG. 1, at the top, where output amplitude 36 includes invariant regions 38, shown as truncated triangular portions.

The size difference between each loop 30 and each flux modulator 44 is described above in terms of distances along measurement axis 12. However, it should be understood that invariant regions (e.g., 38) may be formed in output amplitudes produced by sense windings in other manners. In general, an invariant region is generated in an output amplitude of a sense winding during any movement during which the proportion of the positive and/or negative loops that is screened by flux modulators does not vary with such movement. Put another way, the output signal for a sense winding (e.g., 22) is insensitive to displacement of first member 20 relative to second member 40 along measurement axis 12 while the amplitude is in an invariant region 38. However, as will be seen below, the amplitude of the invariant regions is sensitive to error parameters that contribute to position error between first member 20 and second member 40, such as scaling, offset and linearity errors.

For the embodiments illustrated herein, offset errors may be insignificant because the DC output of a continuously excited transformer is zero. Linearity errors are minimized in the variant regions by design since the overlapping of the loop and flux modulator areas is linear with displacement. However, scaling errors, which are often due to spacing between first member 20 and second member 40 (but potentially due to other factors as well, such as excitation amplitude or temperature effects), are also addressed by the features disclosed herein.

The example displacement transducer 10 depicted in FIG. 1 includes a single sense winding 22 that produces a series of invariant regions 38 in output amplitude 36 of sense winding 22 as first member 20 and second member 40 are displaced relative to one another along measurement axis 12. Such an embodiment may require at least some movement of first member 20 relative to second member 40 along measurement axis 12 in order to produce an invariant region. With only a single sense winding, displacement along measurement axis 12 may not be distinguishable from one position to another in that invariant region, just as direction of motion may not be distinguishable from a single output of a quadrature type encoder.

However, even with only the single sense winding 22, the amplitude of invariant regions 38 may be used to determine a position of first member 20 relative to second member 40 apart from their positions relative to one another along measurement axis 12. For example, the amplitude of invariant regions 38 may be indicative of spacing between first member 20 and second member 40 (e.g., gap, or "pen to paper" distance, in a printer). The spacing between first member 20 and second member 40 may be inversely proportional to the amplitude of the invariant regions 38, and may be determined using known methods employed in inductive proximity sensors and induced eddy currents and/or Q-spoiled sensors.

To provide additional utility beyond determining spacing between first member 20 and second member 40, some embodiments include two or more sense windings mounted on first member 20 at positions phase offset from one another (e.g., in quadrature). If the loops of each sense winding are sized appropriately relative to the size of the flux modulators 44, as described above, the multiple sense windings each produce an output amplitude having invariant regions phase offset from the invariant regions of the other output amplitude. Thus, at any given moment, an invariant region may be more likely to be available (or in some cases, may be always available).

Figure 2:
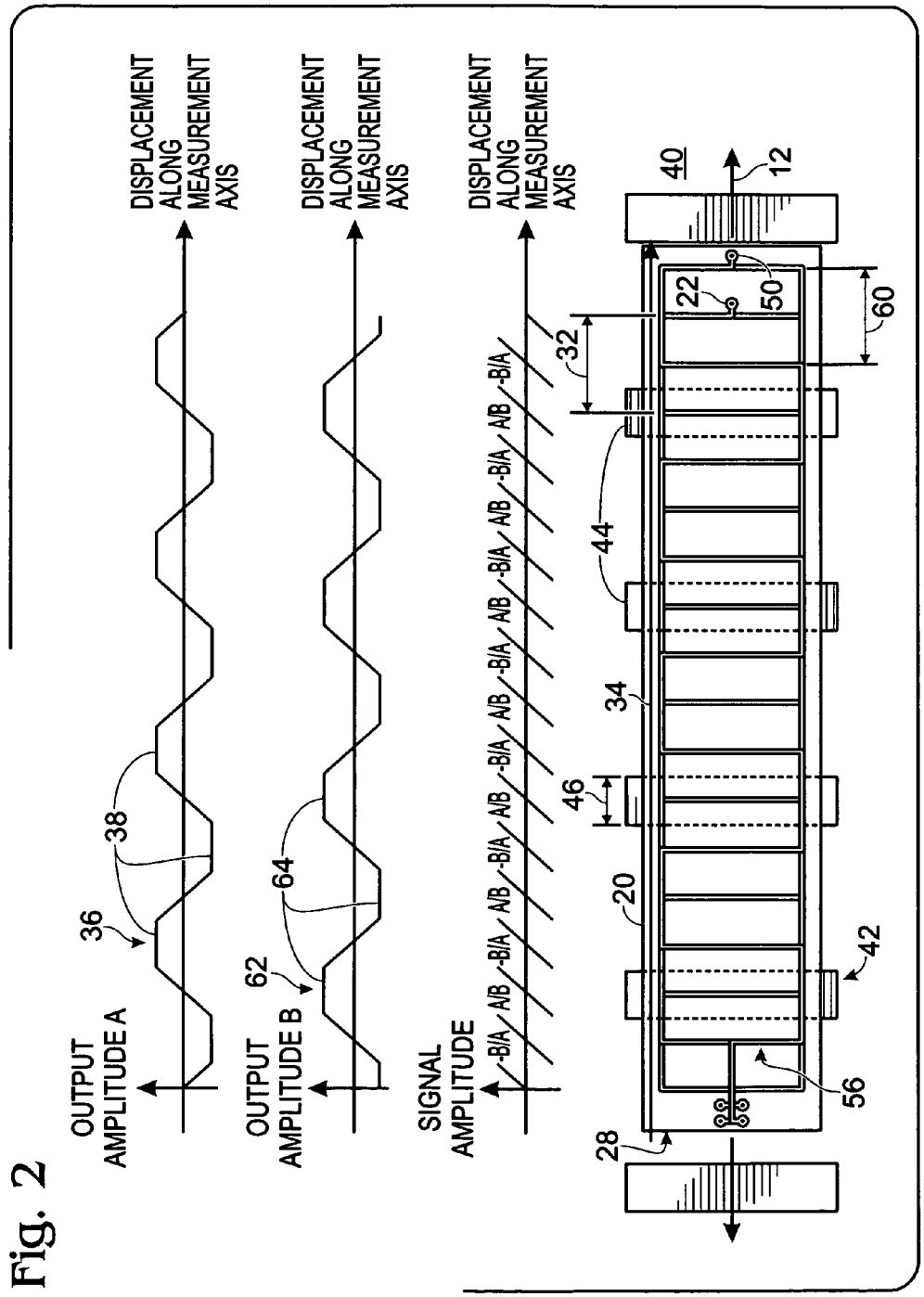
FIG. 2 is a schematic view of a displacement transducer including two sense windings offset from one another to produce two signals, according to an embodiment of the disclosure.

For example, in FIG. 2, the displacement transducer includes, in addition to first sense winding 22, a second sense winding 50 that is similar to sense winding 22. Second sense winding 50 is mounted on first member 20 and comprises a second series of loops (indicated at 56) of alternating polarity extending along measurement axis 12. As was the case with first distance 32, each loop of second series 56 extends along measurement axis 12 for a third distance 60 that is different from second distance 46. In the embodiment shown in FIG. 2, first distance 32 and third distance 60 are the same, in order for the output amplitude B of second sense winding 50 to have the same shape as the output amplitude A of sense winding 22.

In the embodiment in FIG. 2, the two sense windings are phase offset from one another by 90 degrees, or ½ first distance 32. A benefit of this arrangement is seen in the OUTPUT AMPLITUDE A and B charts in FIG. 2. While first signal amplitude 36 is variant, second signal amplitude 62 is invariant 64, providing a scaling error compensating reference for that variant region of first signal amplitude 36. Likewise, when second signal 62 amplitude is variant, first signal amplitude 36 is invariant (38), providing a scaling error-compensating reference for that variant region of second signal amplitude 62.

Figure 9:
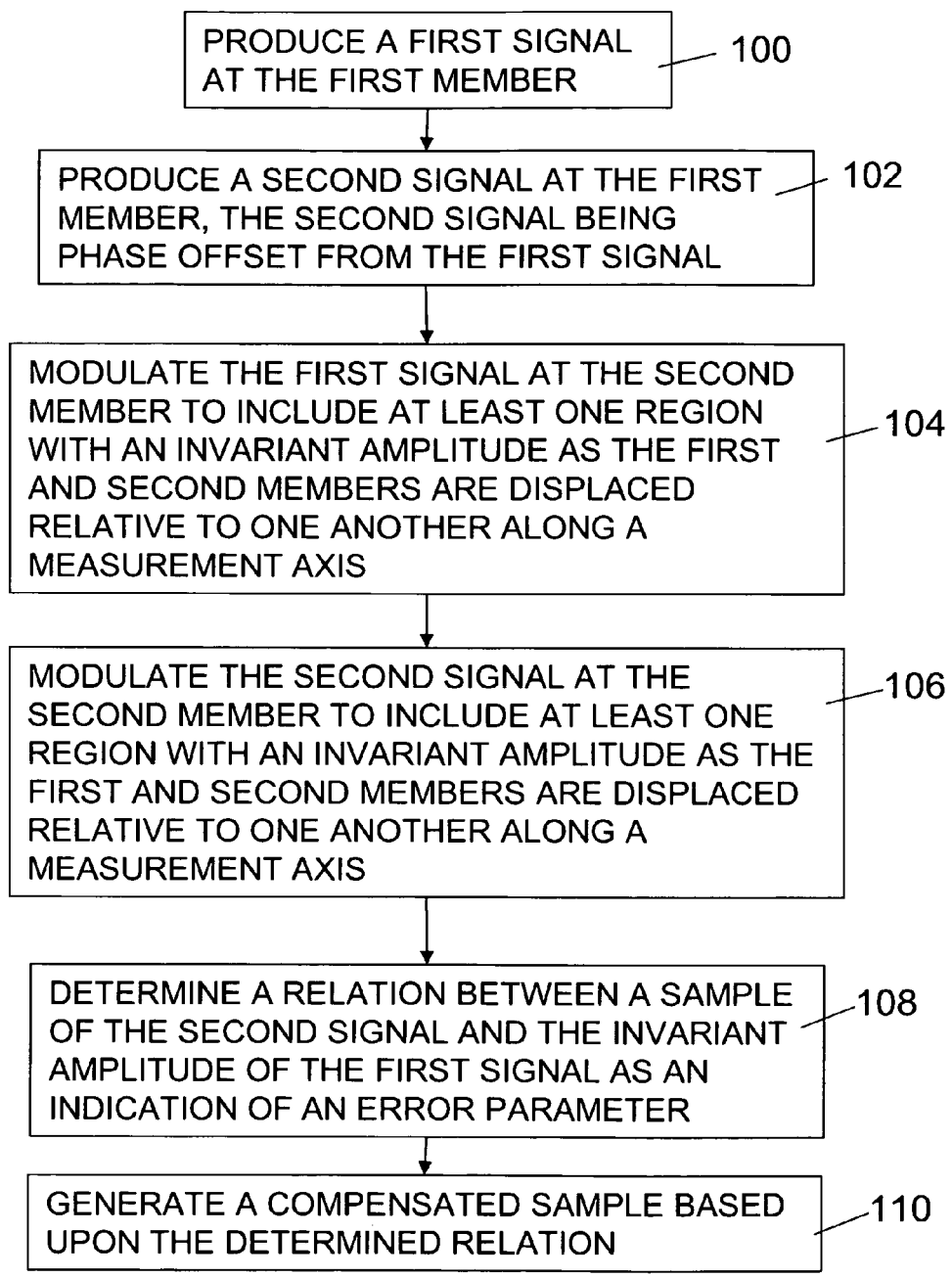
FIG. 9 depicts a method of compensating for position error in a linear transducer, according to an embodiment of the disclosure.

An example method of compensating scaling error using invariant regions is depicted in FIG. 9. These steps are not limited to sequential or successive execution, and may be executed in any order, including simultaneously, and may be partially or entirely performed by control circuitry. In step 100, a first signal is produced at first member 20. In step 102, a second signal is produced at first member 20. Typically, though not always, the second signal is phase offset from the first signal (for example, by 45, 60 or 90 degrees). In step 104, the first signal is modulated to include at least one region with an invariant amplitude as first member 20 and second member 40 are displaced relative to one another along measurement axis 12. This could be accomplished, for instance, by placing a series 42 of appropriately-sized flux modulators 44 in the flux created by excitation winding 34, as described above. Although not required, in step 106, the second signal is modulated in a similar fashion.

In step 108, a relation between a sample of the output of one of the sense windings, typically from within a variant region, and the amplitude of the output of the other sense winding in the invariant region, is determined. This typically includes determining in which quadrature state a sample resides, as well as determining a mathematical relation in which the sample of the output of one signal and the invariant amplitude of the output of the other signal are to be combined for compensation purposes. For example, the following steps may be performed to determine the relation:

Measure the outputs of sense windings 22 and 50.

Determine which quadrature state in which a measured output sample resides. There are four possible quadrature states that are repeated along measurement axis 12, and the particular quadrature state in which a given output sample lies may be determined as follows (ABS refers to absolute value):

If ABS(A)>=ABS(B) and A<0, quadrature state=1
If ABS(B)>=ABS(A) and B>0, quadrature state=2
If ABS(A)>=ABS(B) and A>0, quadrature state=3
If ABS(B)>=ABS(A) and B<0, quadrature state=4

The quadrature state of an output sample determines how the scaling error of the sample is compensated. The results are illustrated in FIG. 2 in the SIGNAL RATIO chart:

If quadrature state=1, compensated output=−B/A
If quadrature state=2, compensated output=A/B
If quadrature state=3, compensated output=−B/A
If quadrature state=4, compensated output=A/B Once the relation is determined, in step 110, a compensated sample is generated based upon the determined relation, the measured sample and the invariant amplitude.

Once the compensated output is determined, the relative positions of first member 20 and second member 40 along measurement axis 12 can be determined using steps similar to the following:

A total count of quadrature states is updated if the state has changed from the previous sample.

If the quadrature state has changed from 1 to 2, from 2 to 3, from 3 to 4, or from 4 to 1, the first member 20 has moved one quadrature state to the right, so increment the total count of quadrature states by 1.

If the quadrature state has changed from 1 to 4, from 2 to 1, from 3 to 2, or from 4 to 3, the first member 20 has moved one quadrature state to the left, so decrement the total count of quadrature states by 1.

In some embodiments, more than two sense windings may be deployed. For example, in the embodiment of FIG. 3, a third sense winding 70 is mounted on first member 20 and comprises a third series of loops (indicated at 76) of alternating polarity extending along measurement axis 12. Each loop of third series 76 extends a fourth distance 80 along measurement axis 12. As was the case with first distance 32 and third distance 60, fourth distance 80 is different from second distance 46. In FIG. 2, fourth distance 80 is equal to first distance 32 and third distance 60.

As first member 20 and second member 40 are displaced relative to one another along measurement axis 12, second sense winding 50 and third sense winding 70 produce a second output amplitude 62 and a third output amplitude 82, respectively, which are shown below output amplitude 36 of first sense winding 22 at the top of FIG. 3. Because third distance 60 and fourth distance 80 are different from second distance 46, second output amplitude 62 and third output amplitude 82 include invariant regions 64 and 84, respectively.

In FIG. 3, the sense windings 22, 50, and 70 are phase offset from one another by ⅓ of distance 32, 60 or 80, or in other words, by 60 degrees. It can be seen that the "corners" at the transitions between the variant and invariant regions are rounded, rather than sharp. This deviation from the "ideal" signal (which has pointed edges as seen in some of the other drawings) is linearity error, which as described above is another error parameter that contributes to position error. Such error may be found in other embodiments, and likely will always be present in real-world application, but is not shown in the other drawings for simplicity's sake.

The addition of third sense winding 70 reduces the linearity error illustrated by the rounded corners by avoiding sampling from the nonlinear portions of the output amplitudes near the transitions between the variant and invariant regions. Instead, only the most linear (or invariant) portions of the signals are used to calculate a position of first member 20 relative to second member 40 along measurement axis 12. In many applications, two windings may be sufficient, but for a high accuracy transducer, three windings may be preferred. Three sense windings assures that a uniform portion of an invariant region will be available, and also assures that linearly varying portions (i.e., variant regions) in between the invariant regions will also be available. These nearly ideal portions of the output amplitude signals can be used to calculate the relative position of first member 20 to second member 40 along measurement axis 12 with nearly perfect linearity while also correcting scaling error.

This manner of reducing linearity error can be seen in the SIGNAL COVERAGE chart below the first, second and third output amplitudes. No matter where first member 20 is positioned along measurement axis 12 in relation to second member 40, at least one of first output amplitude 36, second output amplitude 62 or third output amplitude 82 will be in an invariant region. Thus, the amplitude of an invariant region is continuously available for determining a distance between first member 20 and second member 40, without requiring movement of first member 20 relative to second member 40 along measurement axis 12. Other offsets besides ⅓ or 60 degrees are also contemplated.

In the embodiments of FIGS. 1-3, the flux modulators 44 and the loops of the sense windings have different widths (or more generally, areas) to produce the regions of invariant amplitude. However, in other embodiments the loops of the sense windings and the flux modulators may have similar widths, thus producing output amplitudes without invariant regions. FIG. 4 depicts such an embodiment, which includes first sense winding 22 and second sense winding 50 offset from one another. Because the flux modulators 44 in FIG. 4 are the same width as the loops (½ the repeat length 48), there are no invariant regions in the output amplitude A or output amplitude B; they are simply triangular.

In such embodiments, a compensation winding 90 may be provided that is configured to produce a signal that has a continuous invariant amplitude as first member 20 and second member 40 are displaced relative to one another along measurement axis 12. This invariant amplitude (two examples are indicated in FIG. 4 at S1 and S2) may be used as described above to compensate the outputs of the other sense windings (e.g., 22, 50) for scaling error.

FIG. 4 depicts two variations of compensation winding 90 at 90A and 90B, but typically only one or the other will be used. Both variations include a single loop having a width 96 along measurement axis 12 that is an integer multiple of repeat length 48. Compensation winding 90A has a width 96A that is equal to repeat length 48. Compensation winding 90B has a width 96B that is equal to the entire width of first sense winding 22 and second sense winding 50 along measurement axis 12.

Providing compensation winding 90 with a single loop excludes transition regions entirely from the signal processing, exhibiting better linearity compensation than the two-winding approaches described in relation to FIGS. 1-3. Moreover, this approach may be used to compensate output amplitude waveforms other than the rectangular output amplitudes shown in the drawings (e.g. sinusoidal, which can be implemented with sinusoidal loops instead of rectangular).

Two examples of how scaling error may affect the amplitudes of the outputs of sense windings 22 and 50 are shown in FIG. 4. The positive apexes of one triangular waveform are equal to S1, and the positive apexes of the other triangular waveform are equal to S2. Accordingly, instead of using invariant regions of the amplitudes of first sense winding 22 and second sense winding 50 to compensate the output of the other sense winding, the constant signal (S1 or S2) of compensation sense winding 90 (90A or 90B) may be used as described above to compensate the outputs of sense windings 22 and 50. Although not indicated in FIG. 4, the polarity of compensation windings 90A and 90B should be understood to be positive because the signals S1 and S2 are positive. If the polarity of compensation winding 90 is negative, then the continuously invariant signal would always be negative.

Figure 10:
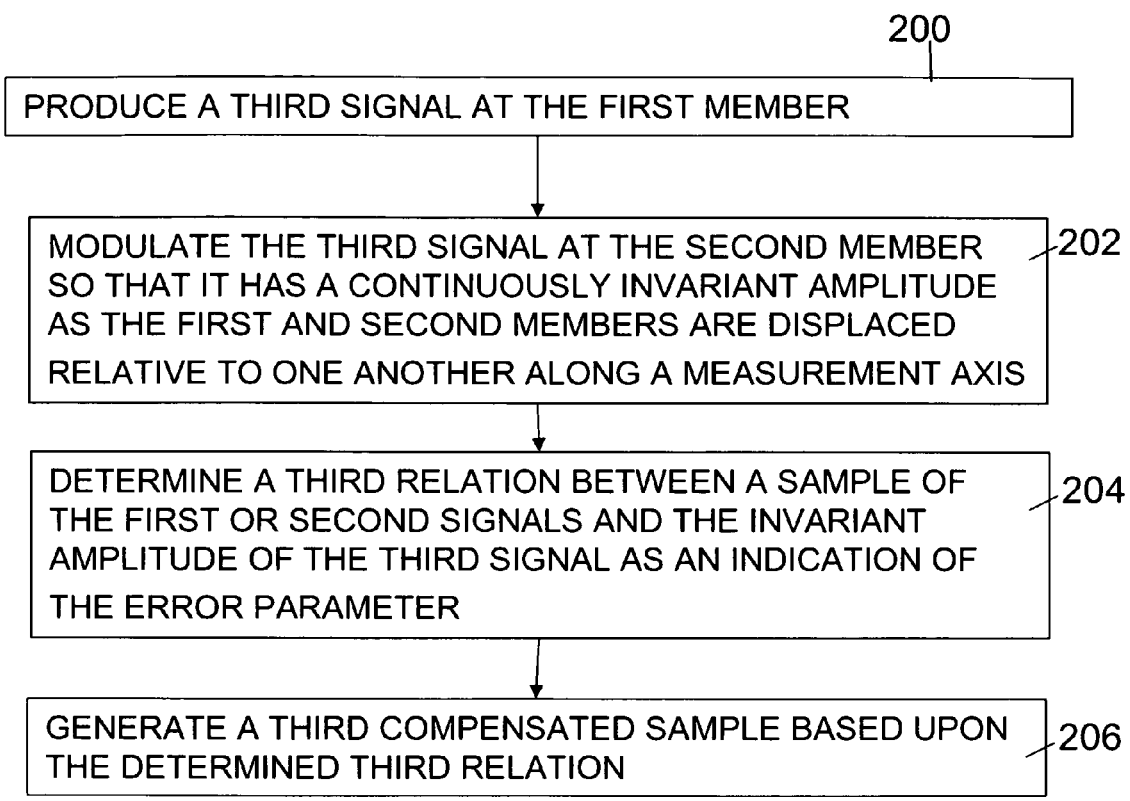
FIG. 10 depicts additional steps that may be performed with the method of FIG. 9, according to an embodiment of the disclosure.

In some embodiments, compensation winding 90 may be included with two or more sense windings such as those shown in FIG. 2 to combine the benefits of both embodiments. FIG. 10 depicts method steps that may be added to the steps of FIG. 9 to achieve such a result using a third signal produced by, among other things, a third compensation sense winding 90. In particular, in step 200, a third signal is produced at the first member. In step 202, the third signal is modulated so that it has a continuously invariant amplitude as first member 20 and second member 40 are displaced relative to one another along measurement axis 12. In step 204, third relation between a sample of the first or second signals (from within their variant regions) and the invariant amplitude of the third signal is determined as an indication of the error parameter. In step 206, a third compensated sample is generated based upon the determined third relation.

Error parameters such as offset and linearity are introduced where there is tilt between first member 20 and second member 40. FIG. 8 depicts first and second members similar to those of FIGS. 1-3 viewed from a direction perpendicular to measurement axis 12, and parallel to the planes of the scale and windings in order to demonstrate the meaning of "tilt" as it pertains to the present disclosure. First member 20 is slightly tilted relative to second member 40 about an axis 14 (see FIGS. 5-7) that is perpendicular to measurement axis 12. Linearity and offset errors are introduced in the zero to peak measurement of the output amplitude versus position by tilt between first member 20 and second member 40.

Although there is no offset (DC component) to the AC signals induced in the sense windings, tilt of first member 20 relative to second member 40 places causes the loops of one polarity (positive or negative) to be closer to the flux modulators 44 than the loops of the other polarity. In such a case, the peak-to-peak (or zero-to-peak) amplitude in the positive invariant regions will be different from that in the negative invariant regions, creating an offset error in the output amplitude waveform (i.e., amplitude will not be centered about zero). Offset errors may be corrected by addition (or subtraction) of a value based upon an invariant amplitude, as will be seen below.

Further, since the loops are not uniformly spaced from the flux modulators 44, the effect of the flux modulators 44 on the flux created by excitation winding 34 will vary non-uniformly with the position of each flux modulator 44 as member 20 is displaced relative to member 40 along measurement axis 12. That is a linearity error. Linearity errors may be corrected by addition or subtraction of a value based on the position. Thus, correction of offset and linearity due to tilt between first member 20 and second member 40 can be corrected in a single operation, since both are proportional to tilt. Scaling errors may be corrected by multiplication (or division) of a value based upon an invariant amplitude.

Referring now to FIGS. 5-7, variations of compensation sense winding 90 may be provided to compensate linearity and offset produced by tilt between two members. One or more compensation sense windings 90 may be mounted on first member 20 to compensate for tilt between first member 20 and second member 40 about an axis 14 perpendicular to measurement axis 12. Each compensation sense winding 90 includes a series 92 of loops extending along measurement axis 12. As was the case with the compensation windings 90A and 90B shown in FIG. 4, each loop 94 extends along measurement axis 12 for a distance 96 that is an integer multiple of a repeat length 48 of the series of flux modulators 42.

Without tilt between first member 20 and second member 40, the compensating sense windings 90 of FIGS. 5-7 nominally output zero because the positive and negative loops overlap the series 42 of flux modulators equally, regardless of the relative positions of first member 20 and second member 40 along measurement axis 12. And because each loop 94 extends along measurement axis 12 for a distance 96 that is an integer multiple of a repeat length 48 of the series of flux modulators 42, each tilt-compensation sense winding 90 is insensitive to displacement between first member 20 and second member 40 along measurement axis 12.

However, with tilt between first member 20 and second member 40 (as shown in FIG. 8) about an axis 14 perpendicular to measurement axis 12, the output of compensation sense winding 90 will be non-zero, and more particularly, will be proportional to the tilt. Accordingly, the output of any of the compensating sense windings 90 depicted in FIGS. 5-7 can be used to compensate for tilt-induced error parameters in the output of another sense winding on first member 20.

Embodiments having two or more loops, such as those shown in FIGS. 5-7, may be used to compensate scaling. For example, if both loops of FIG. 6 have the same polarity, the sum of the two outputs is proportional to the maximum output of the sense windings, and the difference of the outputs of each loop of FIG. 6 is proportional to the tilt. Therefore a single compensation winding 90 may be used to compensate scaling error by division, as described above, as well as offset and linearity error caused by tilt between first member 20 and second member 40.

One method of scaling the output of compensated sense winding 90 includes the following steps:

Measuring the outputs of sense windings 22, 50 to obtain uncompensated samples, and compensation sense winding 90.

Determining the quadrature state using the samples from sense windings 22 and 50, as described above;

Determine an approximate position within the quadrature state based on the uncompensated output amplitudes of the sense windings;

Calculate or look up predetermined error-correction values, such as coefficients of tilt, C(A) and C(B), based on the quadrature state and the approximate position within the quadrature state for each sense winding. Predetermined error-correction values for each winding, such as the coefficient of tilt, C(x), may be calculated based on geometry or measured empirically (e.g., contained in a lookup table);

Add to the measured samples a product of the amplitude of the output of compensation sense winding 90 and the determined coefficient of tilt.

Corrected Output A=A+T*C(A);

Corrected Output B=B+T*C(B);

Determine a corrected quadrature state using the tilt-corrected outputs.

Determine a corrected position within the quadrature state based on the tilt-corrected outputs.

Displacement transducers such as those described above may be used in various systems. For example, first member 20 may be a portion of a printhead and second member 40 may be a portion of a printer situated underneath the printhead and extending along a printer tray along the measurement axis 12. In another example, displacement transducer 10 is incorporated into a caliper, with first member 20 being a sliding member and second member 40 being the underlying scale. Some embodiments may be used in rotary configurations where the measurement axis is curved, rather than linear. Additionally, although the above discussion focuses on inductive displacement transducers, the disclosed devices, systems and methods may be used with other types of electrical and optical displacement applications.

The invariant regions may be configured to provide a reference to compensate scale errors by means such as division, and as set forth as the embodiments of an inductive transducer herein. That reference can act as a second measurement axis of limited range, perpendicular to the primary measurement axis, and useful for an application such as pen to paper spacing in an inkjet printer. For other applications, the output of the tilt winding, as well as compensating for tilt could be useful as a second measurement axis. For some applications, offset may be the primary error parameter, and, in that case, the sensors could be configured to produce an invariant signal in the "zero output" region of the signal to be used to compensate the offset error by means such as subtraction. Failure to sample exactly synchronously with the peak signal (or at the same point relative to the excitation signal from set of samples to set of samples) is another source of scaling error, and may be compensated for along with variation in spacing and excitation amplitude by use of the invariant portions of the output signals as disclosed herein.

Although not specifically described above, the amplitudes of the invariant regions may be measured using various known methods. For example, the amplitude could be measured by such means as an ideal bridge, RMS voltmeter, or simple peak detector, but those means would not reflect the polarity of the signal (the output amplitude would always be positive or zero), and would require multiple phases to eliminate ambiguity in the position. The preferred method is a peak detector or other sampling method synchronous with the peaks of the output signal of excitation winding 34. That will return the zero to peak amplitude (exactly half the peak to peak amplitude, except for distortion in the excitation signal which scaling error correction also cancels, since the output of a transformer has no DC offset), and, if the polarity of the measured zero to peak voltage matches that of the excitation signal, its polarity is positive, otherwise it is negative.

The methods disclosed herein are generally useful for any type of sensor for which matching between separate sensing elements can be readily achieved, since multiple sensors are employed. In some instances, the primary driver of the invariant signal may be measured usefully by the magnitude of the invariant signal.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A method of compensating for an error parameter between first and second members in a displacement transducer, comprising:

producing a first signal at the first member; producing a second signal at the first member;

modulating the first and second signals at the second member so that, as the first and second members are displaced relative to one another along a measurement axis, the first signal includes a region with an invariant amplitude and the second signal includes a region with a variant amplitude;

determining a first relation between a sample of the second signal from within the region of variant amplitude and the invariant amplitude of the first signal as an indication of an error parameter;

generating a first compensated sample based upon the first relation;

modulating the first signal at the second member to include at least one region with a variant amplitude as the first and second members are displaced relative to one another along the measurement axis;

modulating the second signal at the second member to include at least one region with an invariant amplitude as the first and second members are displaced relative to one another along the measurement axis;

determining a second relation between a sample of the first signal from within the at least one region with a variant amplitude and the invariant amplitude of the second signal as an indication of the error parameter; and generating a second compensated sample based upon the determined second relation.

2. The method of claim 1, wherein generating the first compensated sample comprises dividing the sample of the second signal by a value based upon the invariant amplitude of the first signal.

3. The method of claim 1, wherein generating the first compensated sample comprises adding to the sample of the second signal a value based upon the invariant amplitude of the first signal.

4. The method of claim 3, wherein the value based upon the invariant amplitude of the first signal is a product of the amplitude of the first signal and a predetermined error-correction value corresponding to a position of the sample within the second signal.

5. The method of claim 1, wherein producing the second signal includes producing the second signal at a 90-degree phase offset from the first signal.

6. The method of claim 5, further comprising:
producing a third signal at the first member;
modulating the third signal at the second member so that it has a continuously invariant amplitude as the first and second members are displaced relative to one another along a measurement axis;
determining a third relation between a sample of the first or second signals and the invariant amplitude of the third signal as an indication of the error parameter; and generating a third compensated sample based upon the determined third relation.

7. The method of claim 1, further comprising:
producing a third signal at the first member; modulating the second signal at the second member to include at least one region with a variant amplitude as the first and second members are displaced relative to one another along the measurement axis;
modulating the third signal at the second member to include at least one region with an invariant amplitude as the first and second members are displaced relative to one another along the measurement axis; determining a third relation between a sample of the second signal and the invariant amplitude of one of the first and third signals as an indication of the error parameter; and
generating a third compensated sample based upon the determined third relation.

8. The method of claim 1, wherein modulating the first signal includes modulating the first signal at the second member so that it has a continuously invariant amplitude as the first and second members are displaced relative to one another along a measurement axis.

9. The method of claim 1, wherein the region of the first signal with the invariant amplitude is produced by:
a first sense winding including at least a single loop mounted on a first member along the measurement axis so that it extends a first distance along a measurement axis;
a second sense winding including a series of loops of alternating polarity mounted on the first member along the measurement axis;
a series of flux modulators mounted on a second member, each extending a second distance along the measurement axis that differs from the first distance, wherein the region of invariant amplitude is produced by displacing the first and second members relative to one another along the measurement axis to create variation between the first and second distances.

10. The method of claim 9, wherein the first distance is ½ of a repeat length of the series of flux modulators along the measurement axis, and the second distance is one of ¼ and ¾ of the repeat length.

11. The method of claim 9, wherein the first distance is ¼ of a repeat length of the series of flux modulators along the measurement axis, and the second distance is ½ of the repeat length.

12. The method of claim 9, wherein the first distance is equal to an integer multiple of a repeat length of the series of flux modulators.

13. The method of claim 1, wherein the region of the first signal with the invariant amplitude is produced by:
a first sense winding including at least a single loop mounted on the first member along the measurement axis so that it extends a first distance along a measurement axis;
a second sense winding including a series of loops of alternating polarity mounted on the first member along the measurement axis, each loop of the second sense winding extending a second distance along the measurement axis;
a third sense winding including a series of loops of alternating polarity mounted on the first member along the measurement axis at an offset of ½ of second distance from the second sense winding, each loop of the third sense winding extending a third distance along the measurement axis;
a series of flux modulators mounted on the second member, each extending a fourth distance along the measurement axis that differs from the first distance, wherein the variation between the first and fourth distances produces at least one region of invariant amplitude in the first signal as the first and second members are displaced relative to one another along the measurement axis.

14. A method of compensating for an error parameter between first and second members in a displacement transducer, comprising:
producing a first signal at the first member; producing a second signal at the first member;
modulating the first and second signals at the second member so that, as the first and second members are displaced relative to one another along a measurement axis, the first signal includes a region with an invariant amplitude and the second signal includes a region with a variant amplitude;
determining a relation between a sample of the second signal from within the region of variant amplitude and the invariant amplitude of the first signal as an indication of an error parameter;
generating a compensated sample based upon the relation;
wherein the region of the first signal with the invariant amplitude is produced by:
a first sense winding including at least a single loop mounted on the first member along the measurement axis so that it extends a first distance along a measurement axis;
a second sense winding including a series of loops of alternating polarity mounted on the first member along the measurement axis, each loop of the second sense winding extending a second distance along the measurement axis;
a third sense winding including a series of loops of alternating polarity mounted on the first member along the measurement axis at an offset of ½ of second distance from the second sense winding, each loop of the third sense winding extending a third distance along the measurement axis; and
a series of flux modulators mounted on the second member, each extending a fourth distance along the measurement axis that differs from the first distance, wherein the variation between the first and fourth distances produces at least one region of invariant amplitude in the first signal as the first and second members are displaced relative to one another along the measurement axis.

* * * * *